No. 883,221. PATENTED MAR. 31, 1908.
M. MILLER.
APPARATUS FOR TREATING, STORING, AND DELIVERING WATER.
APPLICATION FILED JULY 2, 1906.
4 SHEETS—SHEET 2.
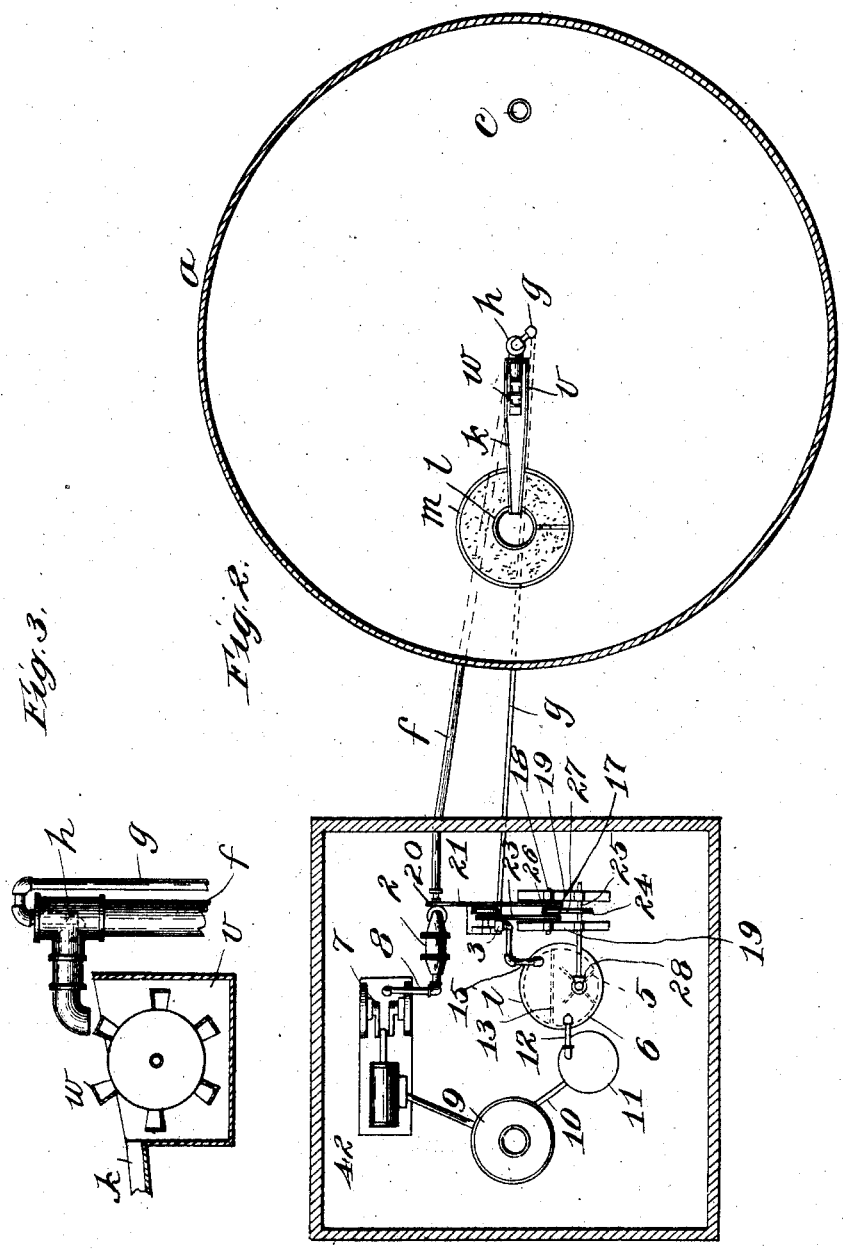
Witnesses:
Inventor:
Marshall Miller
By Harry Irwin Cromer
Atty

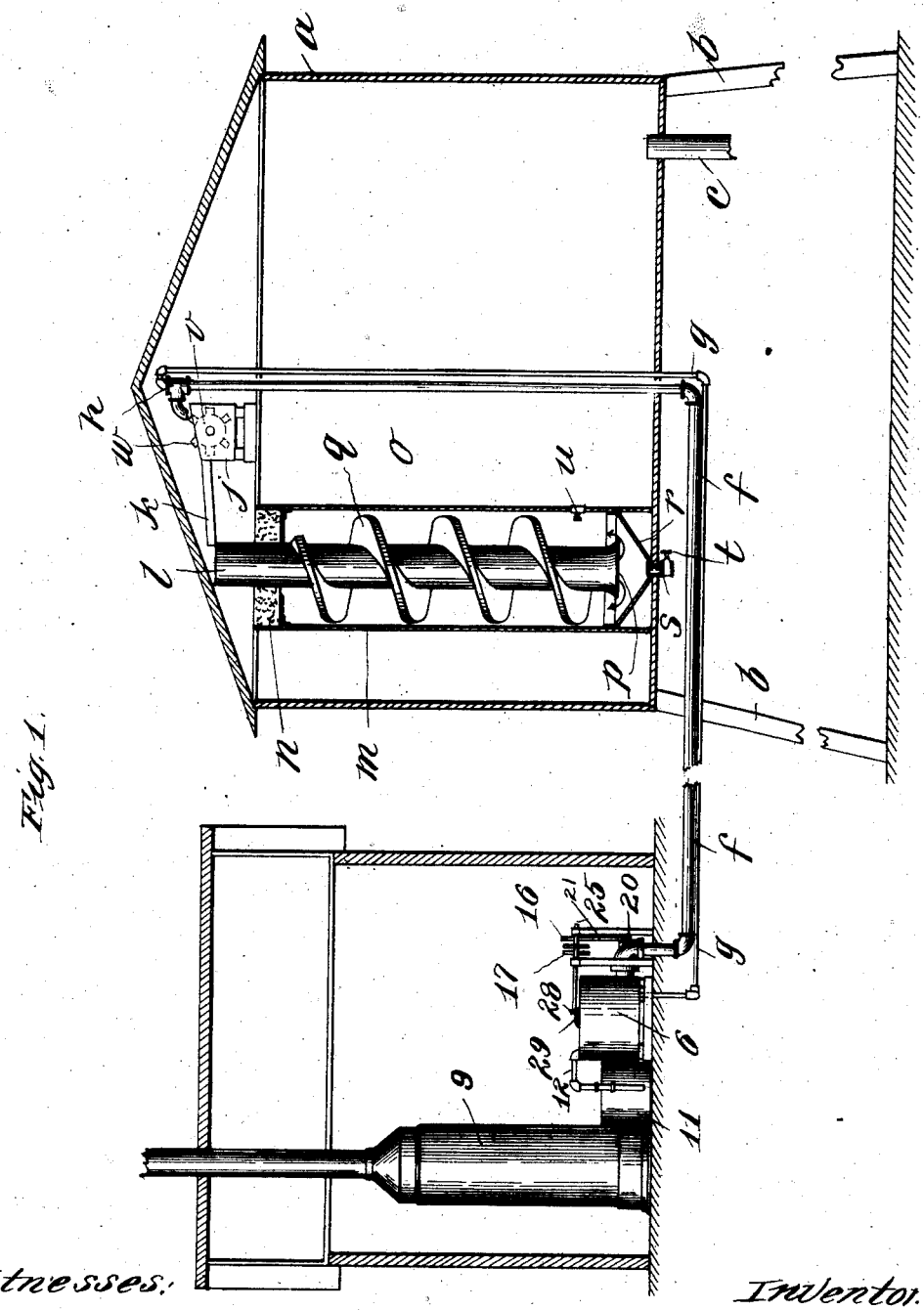

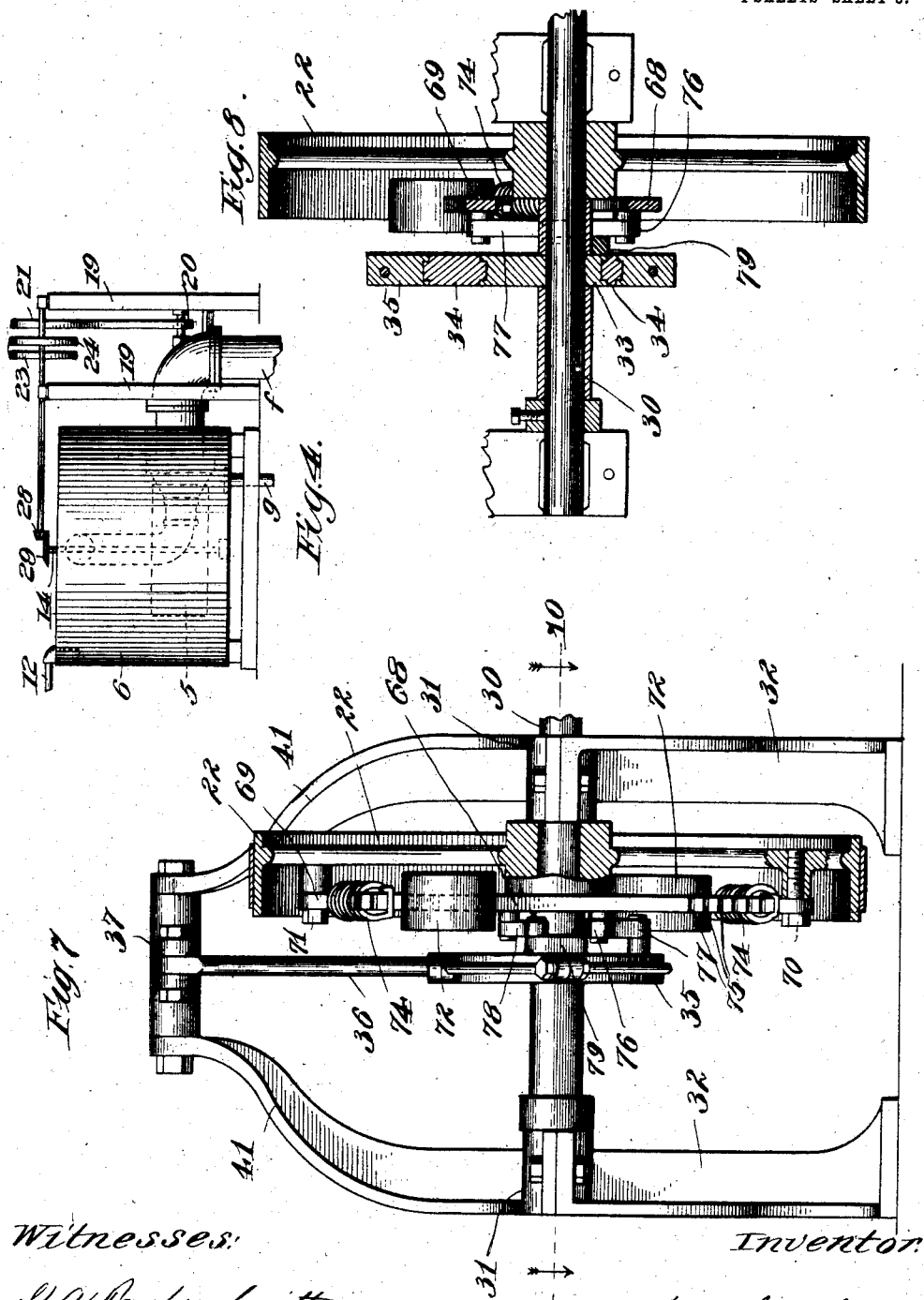

No. 883,221. PATENTED MAR. 31, 1908.
M. MILLER.
APPARATUS FOR TREATING, STORING, AND DELIVERING WATER.
APPLICATION FILED JULY 2, 1906.
4 SHEETS—SHEET 4.
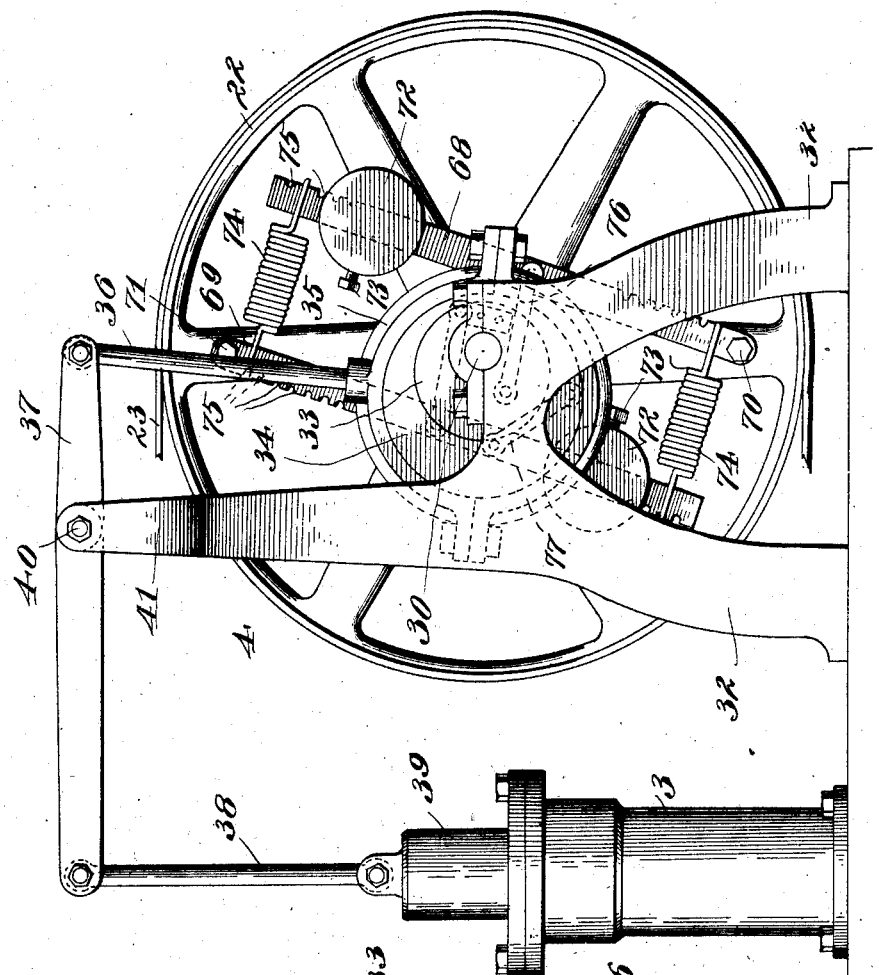
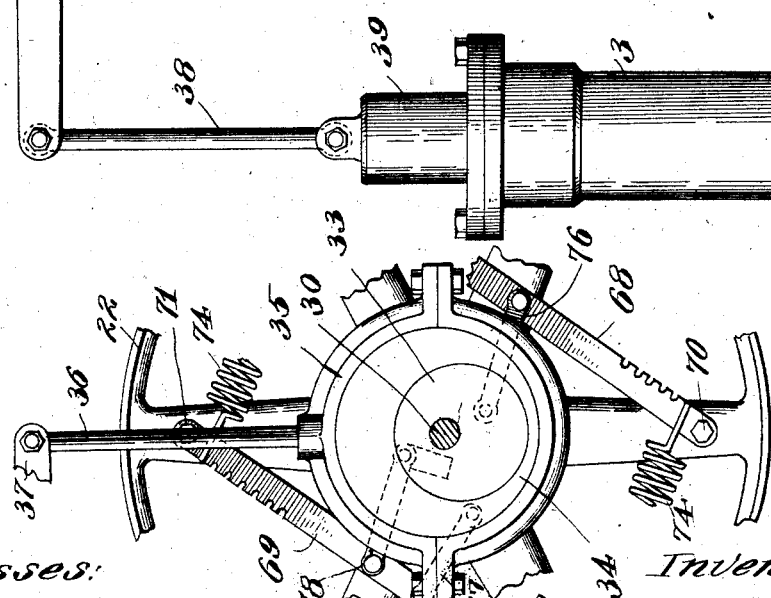
Witnesses:
G. A. Rauberschmidt
C. T. Smith.
Inventor:
Marshall Miller
By Harry Irwin Cromer
Atty

UNITED STATES PATENT OFFICE.

MARSHALL MILLER, OF ST. LOUIS, MISSOURI.

APPARATUS FOR TREATING, STORING, AND DELIVERING WATER.

No. 883,221.  Specification of Letters Patent.  Patented March 31, 1908.

Application filed July 2, 1906. Serial No. 324,441.

*To all whom it may concern:*

Be it known that I, MARSHALL MILLER, a citizen of the United States, residing in St. Louis, in the county of St. Louis and State of Missouri, have invented certain new and useful Improvements in Apparatus for Treating, Storing, and Delivering Water, of which the following is a specification.

This invention relates to apparatus for treating and purifying and storing water and delivering such treated water to locomotive engines.

It relates particularly to an improved continuous system for treating, softening, purifying and storing water comprising mechanism operated by means of the water to be treated and adapted to pump the required proportion of chemical solution into the water to be treated and which operates the pumping mechanism, and also comprising means for regulating the quantity of chemical solution introduced.

It relates also to the means for preparing and intermixing the chemical solution with the water to be treated, and the means for separating the precipitate and foreign substances from the water.

The principal object of the invention is to provide a simple, economical and efficient apparatus for purifying, storing and delivering water.

A further object is to provide means for stirring or agitating a chemical solution while in course of preparation, means for pumping such chemical solution into the water to be treated, means for automatically regulating the operation of the pump and thereby the quantity or proportion of chemical solution introduced into the water to be treated, means for agitating and aerating the water after the chemical solution has been introduced, means for causing the precipitates and sediment to settle, and means for storing the water at an elevation and in position to be delivered to the tanks of locomotive engines, the apparatus by means of which these purposes are accomplished being operated by the same source of power which supplies the water to be treated and by the current of water so supplied and treated.

A further object is to provide a motor adapted to be operated by a current of water while such current is passing through such motor to a higher plane, and to provide means adapted to be operated by such motor for pumping a chemical solution into the same water which operates the motor, after it passes therethrough, and suitable means also operated by the motor for regulating the operation of the pump and thereby the quantity of chemical solution supplied by such pump and introduced into the water to be treated, all of such elements being operated by the force of the current of water to be treated.

Other and further objects of the invention will appear from an examination of the drawings and the following description and claims.

The invention consists in the features, combinations and details of construction hereinafter described and claimed.

Subject matter described but not claimed herein will be found described and claimed in an application filed in the United States Patent Office in my name on the 12th day of November, 1906, Serial No. 343,045, for an improvement in automatically controlled or self-regulating pumping mechanisms, and an application Serial No. 343,046, filed in my name on said 12th day of November, 1906, for an improvement in water motors—both being divisions of this application.

In the accompanying drawings Figure 1 is a view in sectional elevation of an apparatus constructed in accordance with my improvements. Fig. 2 a diagrammatic or plan view of the same. Fig. 3 a detailed view in side elevation of the discharge ends of the water and chemical supply pipe mechanism and of the mechanism for agitating and aerating the intermixed water and chemical solution. Fig. 4 an enlarged view in elevation of the chemical mixing tank and the gear mechanism for connecting the stirring mechanism and chemical pump with the motor. Fig. 5 a view in side elevation of the governor for controlling the operation or stroke of the chemical pump, and showing the chemical pump and the means for connecting such pump with the motor. Fig. 6 a detail view in side elevation of the governor mechanism shown in Fig. 5 with certain parts omitted or broken away, and showing the position of the governor parts when running at a relatively high speed. Fig. 7 a view in elevation of the governor mechanism shown in Fig. 5, looking toward the left of said figure,— a portion of the pulley wheel being in section, and Fig. 8 a horizontal sectional view of the mechanism shown in Fig. 7.

In constructing an apparatus or system in accordance with my improvements I provide a combined water treating, settling and storage tank $a$ which is mounted upon a suitable tower $b$, which may be of any ordinary and well known type adapted to support the tank $a$ at a suitable elevation so as to enable it to discharge treated water directly into the tanks of locomotive engines to be supplied therewith. The tank $a$ is provided with a discharge pipe $c$, having its discharge opening at the required elevation to discharge the treated water directly into the tanks of locomotive engines. The discharge pipe is adapted to be connected with a stand pipe or locomotive supply pipe which may be of any ordinary and well known type which supply pipe leads from the large storage chamber $o$.

A water supply pipe $f$ leads into the tank $a$ and communicates with a suitable source of water supply, and a chemical supply pipe $g$ leads into the tank $a$, and into the upper end $h$ of the water supply pipe on the inside of the tank $a$, and communicates with the chemical mixing and supply tank $i$. A mixing and agitating chamber $j$ is arranged in the main tank $a$ already described at a suitable elevation and beneath the discharge opening of the water supply pipe, and is provided with a discharge passage $k$ which empties into a vertical pipe $l$. The pipe $l$ leads into a treating chamber $m$ which is also inside the tank $a$, already described, and which is provided at its upper end with a filter which covers the upper end of such treating chamber, so that the treated water must pass through the filter before reaching the main storage chamber $o$ of the tank. It will thus be seen that the tank $a$ is provided with a large main or storage chamber, which is for containing the treated water, and with two other chambers or compartments $j$ and $m$, the chamber $j$ being an initial mixing chamber for aerating and intermixing the water and chemicals, and the chamber $m$ being for the purpose of containing the water during treatment and separating the precipitates and foreign substances therefrom.

The open bottom end $p$ of the pipe $l$ is near the bottom of the treating chamber $m$ so that the intermixed water and chemicals must pass upward the entire length of such chamber to the filter at the top. A helical baffle plate $q$ encircles the pipe $l$ and extends from a point near the top of the treating chamber downward to a point near the bottom thereof. The top of the receiving pipe $l$ is above the level of the upper end of the treating chamber so that the intermixed water and chemicals pass upward on the outside of the helical baffle plate to the filter and the precipitates move downward upon or over the upper face of the helical baffle plate to the bottom of the chamber. The settling of the precipitates to the bottom is thus greatly facilitated by the helical conduit or baffle plate and the upward current of liquid is prevented from opposing the downward movement of the precipitates to any great extent. In other words, it will be readily seen that an eddy is formed by the helical baffle plate which encourages the precipitates to settle and pass downward in a helical path to the bottom of the chamber. The descending precipitates are sheltered from the action of the upwardly moving current of liquid by the helical baffle plate, and the baffle plate not only forms a shield but also a conduit which conducts the precipitates to the bottom of the chamber in an efficient manner. The conduit thus formed is open at all points throughout its length to receive precipitates and foreign substances and conduct them at once to the bottom so as to separate the sediment from the upwardly moving current of water as rapidly and efficiently as possible, the operation being continuous. The bottom of the treating chamber is provided with an inclined portion $r$ having a discharge pipe $s$ leading therefrom and a cock $t$ is provided for opening and closing such discharge passage. A spring valve or plug $u$ is mounted in a suitable opening in the wall of the treating chamber, adapted to admit water from the main storage chamber $o$ for the purpose of washing out the treating chamber when desirable. The mixing tank or chamber $j$ is provided with a wheel $v$ rotatably mounted therein and having on its periphery a plurality of concave paddles or buckets $w$, the open sides of which are in the direction of movement of such wheel when in operation. The closed sides of these buckets are in the current produced by the discharge of the incoming current of water and chemicals from the water and chemical supply pipes into the mixing tank, so that the contents of the mixing tank are agitated by the rotation of the wheel and also aerated by the air which is carried down into the liquid by the rapidly revolving inverted buckets and discharged from such buckets into the liquid as they approach their downward limit of motion.

It is very desirable to provide means whereby the quantity of chemical solution supplied may be regulated so as to remain as nearly as possible uniform in proportion to the quantity of water supplied. The water to be treated is ordinarily under varying pressure and is not constantly of uniform volume. It is desirable that the mechanism for supplying the chemical solution should be operated by means of the current of water to be treated and that the quantity of chemical solution should vary proportionately, or in other words, correspond with the varying quantity or volume of water treated. In order to accomplish this, I provide a motor 2 which is operated by the current of water to be treated, and a chemical pump 3 which may be of any ordinary and well known type and is operated by the motor. Governor mechanism 4 is operatively connected with the chemical pump so as to control the speed of operation or length of stroke of the pump to compensate for variations in the speed of the motor. This governor mechanism is operatively connected with the motor in such a manner that it is operated by the motor but regulates the pump and not the motor. The motor is also operatively connected with the stirring mechanism 5 of the chemical tank 6, as hereinafter described, so that the agitation of the chemical solution in the chemical tank and the introduction of the chemical solution into the water to be treated is accomplished by means of the motor which is operated by the current of water to be treated.

As already suggested, the water to be treated may be obtained from any ordinary suitable source of water supply, such as a water main of any ordinary water supply system. When it is desirable however, a suitable pump 7, which may be of any ordinary type, may be employed to supply the water and may be operatively connected with an engine, motor, or any ordinary and well known source of power, such pump being provided with a water supply pipe 8 leading into the motor 2, already described, and forming with the water supply pipe $f$, a water supply passage or conduit communicating with the mixing, treating and settling tank or chambers.

A boiler 9, which may be of any ordinary and well known form is provided for supplying steam for any purposes required in connection with the operation of the apparatus or the treatment of the chemicals or water. A steam pipe 10 leads from the boiler into a tank 11 which is for the purpose of containing soda ash.

A pipe 12, which communicates with the soda ash tank and is supplied with steam from the boiler, leads into the chemical tank 6, already described, which contains a solution of soda ash and lime or such other chemicals as are suitable for the proper treatment of the water. This pipe is adapted for supplying a suitable steam jet for the treatment of the chemical solution in the chemical tank. The chemical tank may be of any ordinary and well known form and, as here shown, is provided with two compartments separated by a perforated wall 13. Suitable stirring mechanism 5, which may comprise a paddle wheel mounted upon an upright shaft 14 and which paddle wheel may be of any desired type, is arranged in the chemical tank on one side of the perforated wall, and a chemical solution supply pipe 15 leads from the compartment on the other side of the perforated wall to the chemical pump 3, already described.

In order to provide suitable means for operatively connecting the chemical pump and its governor mechanism, and the stirring mechanism of the chemical tank with the motor, a suitable set of gears or belts and pulleys, which may be of any desired known type, are provided. The belts and pulleys here shown are constructed and arranged as follows: Pulleys 16 and 17 are mounted upon a shaft 18 which is journaled in a supporting frame 19, which may be of any ordinary and well known form. The pulley 16 is connected with the driving pulley 20 of the motor 2, already described, by means of a belt 21. The pulley 17 is connected with the pump driving pulley wheel 22, upon which the pump controlling governor, hereinafter described, is mounted by means of a belt 23. A pulley 24 is mounted upon a shaft 25 and operatively connected with a pulley 26 upon the shaft 18 by means of a belt 27,—the shaft 25 being provided with a spur gear 28 in toothed engagement with a spur gear 29 upon the chemical stirring shaft 14, already described. The pump driving belt wheel or pulley 22, already described, is mounted upon a shaft 30 which is journaled in suitable bearings 31 in a supporting frame 32, which may be of any desired type, and is operatively connected with the chemical pump by means of a pair of eccentrics 33 and 34, an eccentric strap 35 upon the outer eccentric 34, a connecting rod 36, a walking beam or pivoted lever 37, and a piston rod 38 which is connected with the reciprocating piston 39 of the chemical pump. The walking beam 37 is pivotally mounted by means of a pivot pin 40 upon an upwardly extending arm 41 of the supporting frame 32 and is pivotally connected at one end with the piston rod 38 and at the other end with the pitman or connecting rod 36 and thereby with the eccentric mechanism already described.

By the above arrangement the chemical solution is stirred while being prepared in the chemical tank and pumped from the chemical tank into the water to be treated; the intermixed chemical solution and the water to be purified is agitated and aerated by means of the revolving wheel $v$ before passing into the treating and separating chamber or baffle chamber $m$. This is all accomplished by the action of the current of water to be treated, such current serving to operate the motor which drives the chemical pump and to operate the governor which controls the pump and the supply of chemical solution, and also serving to operate the agitating mechanism of the mixing chamber $j$. When a pump is used for forcing the water through the motor and water supply pipes, the power which operates such pump and supplies the water may be in the form of an engine 42 suitably connected with the boiler 9 and operatively connected with the pump 7 in any ordinary and well known manner. The same power which forces the water through the motor thus serves to pump the water and chemicals into the treating chamber of the elevated tank and finally into the storage chamber, and regulates the supply of chemical solution in such a manner that the water is chemically treated and purified, allowed to settle, stored and delivered to locomotive engines by a single pumping operation, and the entire process is enabled to be carried on continuously and uninterruptedly by a single source of power and by means of a single storage tank.

It is desirable that a motor be provided which is adapted to be operated by the current of water to be treated while such water is being raised to an elevation higher than the motor by the same power which operates the motor. It is also necessary that the motor be so connected with the chemical pump to be operated thereby as to permit the pump to operate at varying speeds with relation to the motor. In other words, it is desirable to provide means which will permit the pump to be operated at different speeds varying to a greater or less extent from the speed of the motor and compensating for the variance in the pressure of the water which runs the motor and which is to be supplied with chemicals by the chemical pump. When the motor is running at a comparatively slow speed a greater quantity of water for each revolution of its shaft or wheels passes through than when running at a comparatively high speed, and it is necessary in order to obtain the best results to change the speed of operation or length of stroke of the chemical pump with relation to the speed of the motor, and to maintain the speed of such pump and current of chemical solution as nearly uniform as possible with relation to the volume or quantity of water to be treated.

In order to provide suitable means for regulating or changing the length of stroke of the pump and thereby changing the volume of the current of chemical solution to correspond to the variations in the flow of water to be treated, an inner eccentric 33, already described, is rotatably mounted on the shaft 30 and an outer eccentric 34 is rotatably mounted upon such inner eccentric and encircled by the eccentric strap 35, such eccentric mechanism being operatively connected with the chemical pump in the manner already described. The eccentric mechanism is connected with the pump driving belt wheel 22 in such a manner that when the wheel is rotated at a comparatively high speed the eccentrics will be automatically adjusted so as to give the pump piston a comparatively short stroke, and when the wheel is rotated at a comparatively low speed the eccentrics will be automatically adjusted so as to give the pump piston a longer stroke. In short the length of stroke of the pump piston is automatically regulated and varied with relation to the speed of rotation of the wheel 22 and with relation to the speed of the motor so as to correspond as nearly as possible with the varying quantity or flow of water passing through the motor and to be treated. In order to accomplish this, levers 68 and 69 are pivotally secured to the belt wheel 22 which is in fixed relation to the shaft 30, by means of pivot pins 70 and 71. These levers extend normally in parallel relation to each other on opposite sides of the axial center of the wheel, the swinging end of each lever being adjacent to the pivoted end of the other. The swinging end of each lever is provided with a weight 72 adjustably secured thereon by means of a set screw 73. The swinging end of each lever is also yieldingly connected with the pivoted end of the other by means of a helical spring 74, each of such helical springs being connected to both levers by having its opposite ends inserted in notches 75 so that the springs may be adjusted to any desired position longitudinally of the levers. The degree of resistance to the outward movement of the weighted ends of the levers may thus be regulated by the position of the springs. The lever 68 is connected with the relatively small inner eccentric by means of a link 76 which is pivotally secured at one end to the said lever a suitable distance from its pivoted end to afford the required fulcrum, such link being pivotally secured at its other end to the eccentric a sufficient distance from the axial center of the shaft 30 to cause the eccentric to rotate in one direction when lever 68 is moved outward and in the opposite direction when it is moved inward toward the axial center of the shaft, or toward the center of rotation of the eccentric. The lever 69 is connected by means of similar links 77 and 78 with both eccentrics. The link 77 is pivotally secured at one end to the lever 69 and at its opposite end to the large outer eccentric 34 at the desired distance from the axial center of the shaft 30 on one side of such shaft, and the link 78 is pivotally secured at one end to the lever 69 and at its opposite end to the small inner eccentric by means of a connecting block 79, the point of pivotal connection of the respective links 77 and 78 with the eccentrics being on the opposite sides of the shaft 30. In other words, the shaft 30 is intermediate the points of pivotal connection between the respective links 77 and 78 and the eccentrics, so that the outward movement of the lever 69 will cause the eccentrics to rotate in opposite directions bringing the geometrical center of the outer eccentric from normal position inward to a point nearer the axial center of the shaft 30, thus reducing the length of stroke of the pitman or connecting rod 36 and the pump piston. It follows that the movement of the lever 69 inward will tend to rotate both eccentrics so as to move the geometrical center of the outer eccentric further away from the axial center of the shaft 30, thereby increasing the length of stroke of the pitman and the piston of the chemical pump. The extent of the outward and inward movements, or in other words, the relative positions of the weighted levers and of the eccentrics is determined by the speed of the rotation of the belt wheel or pump driving wheel 22 to which such levers are secured,—the outward movements of the levers being produced by the action of centrifugal force and the inward movements by the action of the springs which tend to yieldingly resist the action of such force and to hold the levers and eccentrics in position to produce relatively short strokes of the pump piston. The volume or flow of chemical solution pumped into the water to be treated is thus automatically regulated and caused to vary with relation to the speed of the motor which operates the pump, the variance in the flow of chemical solution corresponding to the variance in the flow or volume of water to be treated and which passes through and operates the motor.

I claim;

1. In an apparatus of the class described, the combination of a receptacle provided with a water treating chamber, means for forming a current of water to be treated and causing it to pass into such chamber, a pump for pumping a chemical solution into the water to be treated, and governor mechanism operatively connected with the pump and adapted to be operated by the current of water to be treated for regulating the operation of the pump.

2. In an apparatus of the class described, the combination of a tank for containing water to be treated, means for introducing a current of water into such tank, a chemical solution containing tank, a pump for pumping chemical solution from such chemical solution containing tank into the water to be treated, a motor for operating such pump, and governor mechanism connected with the chemical pump and adapted to be operated by the motor, for automatically changing the speed of operation of the pump with relation to the motor and thereby controlling the quantity of chemical solution pumped into the water to be treated.

3. In an apparatus of the class described, the combination of a receptacle for containing liquid to be treated, means for introducing a current of liquid into such receptacle, a motor adapted to be operated by such current of liquid, a chemical solution containing tank for containing a chemical solution to be intermixed with the liquid to be treated, a pump operatively connected with the motor and provided with a passage communicating with the chemical solution tank and having a passage adapted to empty into the liquid to be treated, and means for changing the speed of operation of such pump with relation to the motor and thereby governing the proportion of chemical solution pumped into the liquid to be treated.

4. In an apparatus of the class described, the combination of a receptacle for containing liquid to be treated, means for forcing a current of liquid into such receptacle, a pump operating motor arranged in the path of such current of liquid and adapted to be operated thereby, a chemical solution containing tank, a pump connected with and driven by such pump operating motor and provided with a passage communicating with the chemical solution containing tank and having a discharge passage adapted to empty into the liquid to be treated, and means whereby the length of the stroke of the pump plunger is made dependent upon the rapidity of its oscillation.

5. In an apparatus of the class described, the combination of a receptacle for containing water to be treated, means for producing a current of water and causing it to pass into such receptacle, pump operating mechanism arranged in the path of such current of water and adapted to be operated thereby, a pump connected with such pump operating mechanism for introducing a liquid solution into such water, and means for automatically varying the length of stroke of the pump plunger, said means being dependent upon the rate of reciprocation of said plunger.

6. In an apparatus of the class described, the combination of a receptacle provided with a water treating chamber, water supply pipe mechanism forming a passage for supplying water to such chamber, a motor connected with such water supply pipe mechanism and adapted to be operated by the current of water to be treated, a pump for pumping a chemical solution into the water to be treated, means for operatively connecting such pump with the motor, and means for automatically changing the length of stroke of the pump and thereby the quantity of chemical solution passing therethrough relatively to the speed of the motor.

7. In an apparatus of the class described, the combination of a tank having a mixing chamber, a rotatable wheel mounted in such mixing chamber, inlet pipe mechanism arranged to discharge a current of liquid upon such wheel, and a plurality of buckets mounted on the periphery of the wheel with their open sides in the direction of its rotation for stirring and aerating the liquid contained in such mixing chamber.

8. In an apparatus of the class described, an elevated storage tank, a mixing tank in the upper part of said storage tank, a treating tank also inside of said storage tank and beneath the mixing tank, a chemical solution tank below the storage tank, a water-pipe and a chemical solution pipe leading to the mixing tank, a pump for forcing water through said water-pipe, a motor adapted to be operated by the current of water flowing through said pipe, a pump operated by said motor and adapted to force chemical solution through the chemical solution pipe, and a governor to keep the delivery of the pump proportionate to the flow of water through the motor.

9. In an apparatus of the class described, an elevated storage tank, a mixing tank in the upper part of said storage tank, a treating tank also inside of said storage tank and beneath the mixing tank, a chemical solution tank below the storage tank, a water-pipe and a chemical solution pipe leading to the mixing tank, a pump for forcing water through said water-pipe, a motor adapted to be operated by the current of water flowing through said pipe, a pump operated by said motor and adapted to force chemical solution through the chemical solution pipe, and a governor for varying the output of said pump in accordance with the variations in the flow of water through said water-pipe.

10. In an apparatus of the class described, a mixing tank, means for discharging water and chemicals thereto, and a rotary mixing wheel adapted to be operated by the current of water and chemicals, said mixing wheel being provided with concave buckets having their concaved sides turned in the direction of movement of the wheel.

11. In an apparatus of the class described, means for forcing water into an elevated mixing tank, means operated by the current of water for forcing chemical solution into said mixing tank, a governor for varying the flow of chemical solution in accordance with variations in the flow of water, a precipitation and filtering tank, and a storage tank inclosing said before-mentioned tanks.

12. In an apparatus of the class described, the combination of a tank provided with a treating chamber having inlet and outlet openings, a tower upon which such tank is supported at an elevation, a chemical supply tank mounted below the level of the treating chamber, a pump having an inlet passage communicating with the chemical supply tank and provided with a discharge passage communicating with the treating chamber, a water supply pipe communicating with the treating chamber for supplying a current of water to be treated, a motor connected with such water supply pipe and adapted to be operated by the current of water to be treated, means for connecting the motor with the pump to be driven thereby, and means connected with the motor for automatically changing the length of stroke of the pump while in operation and thereby regulating the quantity of chemicals pumped into the water to be treated.

13. In an apparatus of the class described, the combination of a tank provided with a treating chamber, a water supply pipe forming a passage communicating with the treating chamber for supplying a current of water to be treated, a motor connected with such supply pipe and adapted to be operated by the current of water to be treated, a chemical solution containing tank, a pump having an inlet passage communicating with such chemical solution containing tank and provided with a reciprocating piston, a pump operating shaft operatively connected with the motor, an eccentric adjustable with relation to such shaft and operatively connected with the pump piston, means for automatically adjusting the eccentric with relation to the shaft and thereby changing the length of stroke of the pump piston, for controlling the quantity of chemical solution with relation to the water to be treated, and a discharge pipe leading from the pump and forming a passage communicating with the treating chamber.

MARSHALL MILLER.

Witnesses:
  R. G. GURLEY.
  J. A. McFARLAND.